US007350408B1

(12) United States Patent
Rogers et al.

(10) Patent No.: US 7,350,408 B1
(45) Date of Patent: Apr. 1, 2008

(54) APPARATUS AND SYSTEMS FOR INTEGRATION OF A SENSOR INTO A WHEEL

(76) Inventors: Larry K. Rogers, 4 Oakbourne Ct., Bordentown, NJ (US) 08500; Pinkash Bhoratis, 303 Harbour Blvd., Cinnaminson, NJ (US) 06077

( * ) Notice: Subject to any disclaimer, the term of this patent is extended or adjusted under 35 U.S.C. 154(b) by 0 days.

(21) Appl. No.: 11/603,936

(22) Filed: Nov. 22, 2006

(51) Int. Cl.
*E01C 23/00* (2006.01)
(52) U.S. Cl. ............... 73/146; 73/146.5; 340/442; 340/444
(58) Field of Classification Search ....... 73/146–146.8; 340/442–444
See application file for complete search history.

(56) References Cited

U.S. PATENT DOCUMENTS 5,071,259 A * 12/1991 Metzger et al. ............. 374/143
7,021,132 B2 * 4/2006 Nigon et al. ................ 73/146.5

* cited by examiner

*Primary Examiner*—Jewel Thompson
(74) *Attorney, Agent, or Firm*—Shlesinger & Fitzsimmons

(57) ABSTRACT

This apparatus and system for integration of a sensor into a wheel includes sensors for monitoring temperature, pressure or other variables inside of an inflated tire that are mounted directly to or inside of a wheel for the tire, that are in communication with conditions in the tire's interior via ducts or channels in the wheel, and/or that are held in place by and between rim portions of a two piece wheel.

20 Claims, 8 Drawing Sheets

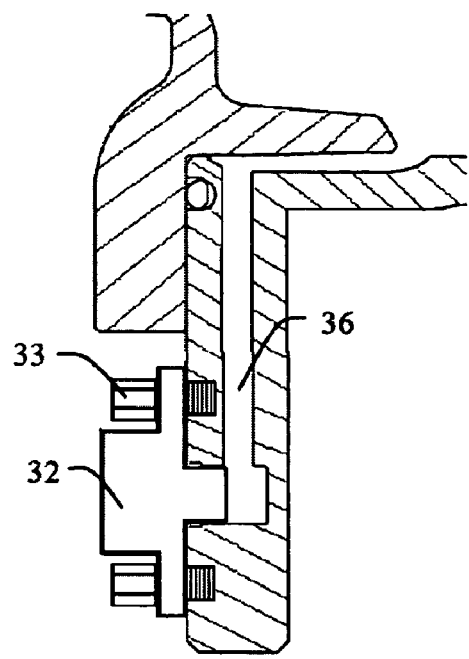
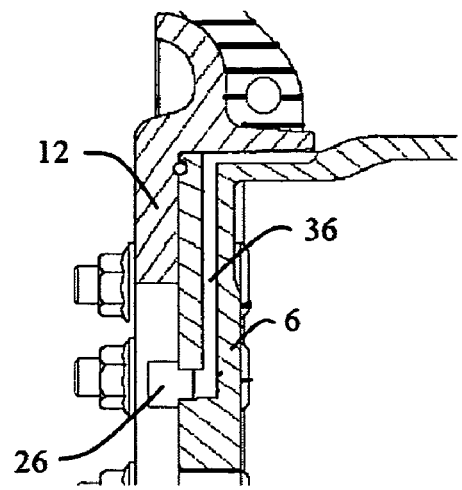
FIG 11
FIG 12
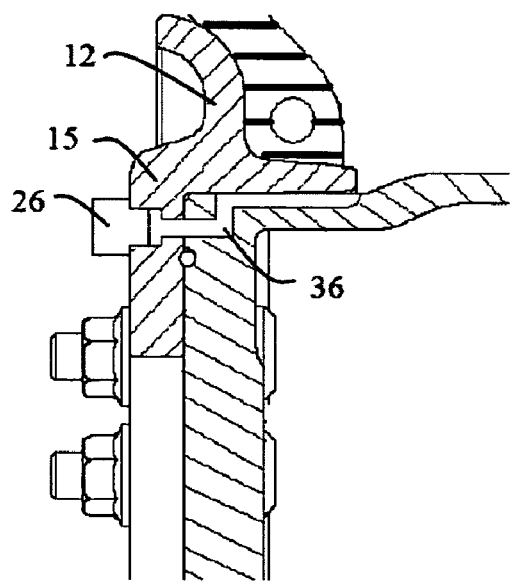
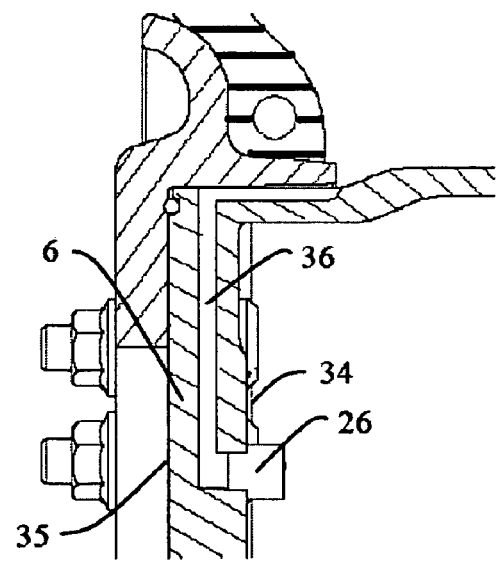
FIG 13
FIG 14

APPARATUS AND SYSTEMS FOR INTEGRATION OF A SENSOR INTO A WHEEL

BACKGROUND AND SUMMARY

This application claims an invention which was disclosed in a provisional application filed Nov. 14, 2006, entitled "Apparatus and Systems for Integration of a Sensor into a Wheel". The benefit under 35 USC § 119(e) of the United States provisional application is hereby claimed, and the aforementioned application is hereby incorporated herein by reference.

The purpose of this invention is to integrate a sensor into a wheel. This is advantageous as various factors, including particularly tire pressure, can be more easily monitored in this fashion. The sensor of our invention may be attached to the wheel or may be integrated into the wheel. An air passageway between the tire cavity and the sensor may or may not be employed.

FIG. 1 shows a section of a one-piece wheel assembly 1 without sensor. The one-piece wheel assembly 1 consists of a wheel 2 with tire 3 and inflation valve 4. The circular wheel 2 includes a rim portion 5, formed coaxially on opposite ends thereof with outwardly flaring circumferential flange sections disposed to be engaged by the beads of a tubeless tire. A transverse wall section, disc portion 6, extends transversely of the axis of the circular wheel 2 and its rim 5, and includes a central opening (hub bore area 9) disposed coaxially on said axis. Also illustrated are drop center area 7, valve hole 8, and hub bore area 9. The tire 3 and rim 5 form a tire air chamber 10 that contains a pressured fluid (usually air).

FIG. 2 shows a section of a two-piece wheel assembly 11 without sensor. The two-piece wheel assembly 11 includes a wheel 12 with tire 3 and inflation valve 4. Parts of wheel 12, as before, include a rim portion 5, a transverse wall or disc portion 6, and a hub bore area 9. Also illustrated, and forming a typical part of a two-piece wheel assembly, is rim flat area 13. The tire 3 and rim 5 form a tire air chamber 10 that, as with the one-piece wheel assembly, contain a pressured fluid (usually air).

Two-piece wheels 12 are usually used when a bead lock 14 or run flat device (not shown) are utilized in the two-piece wheel assembly 11. The wall section of two-piece wheels consists of two major parts, an outer portion (or rim hall) 15 and inner portion (or rim hall) 16. The two portions 15 and 16 are sealed with an o-ring 17 placed between confronting surfaces of the two portions 15 and 16 so as to prevent air from escaping out of tire air chamber 10 (thereby creating a sealed space including tire chamber 10). Studs 18 and nuts 19 bolt the two rim halves 15 and 16 together.

Current technology for use of sensors employs several different configurations and methodologies. First, sensors may be embedded in tire 3 where they are invisible to inspection and generally inaccessible. (This version is not illustrated). Second, as illustrated in FIG. 3, a sensor portion 20 may be placed with the tire interior (air chamber 10) connected to a valve portion 21. The valve portion 21 goes through valve hole 8 in one-piece wheel 2. The sensor portion 20 measures the air pressure in tire air chamber 10 and sends a signal to a monitor (not shown) in the cab portion of the vehicle. Third, as illustrated in FIG. 4, a sensor 22 can be employed anywhere within the tire cavity 10. (The tire 3 and tire chamber 10 are not shown in FIG. 4 so that sensor 22 and bracket or band 23 can be seen). Sensor 22 can be attached with a bracket or band 23 or by any other method inside the tire chamber 10. Fourth, as illustrated in FIG. 5, another technology attaches a sensor 25 directly to the inflation valve 4. Fifth, a sensor may be contained in a sensor body so that it is exterior to the tire chamber, but detects pressure therein via an air channel portion extending through the sensor body from the tire chamber to the sensor. (See, e.g., U.S. Pat. No. 7,089,147).

However, all of the aforesaid methods and apparatus have disadvantages. Sensors inside the tire cavity are subject to harsh environments including elevated temperatures and impact damage. In addition, such sensors are difficult to assemble when inside the tire, there is limited access in case of malfunction, and sensors can be damaged during tire assembly or tire removal. Sensors in the tire cavity may also cause wheel imbalance, may have signal interference due to the tire and or wheel structure, and are expensive to install and maintain. Sensors that attach to inflation valves are susceptible to damage from curbs, rocks or other obstructions on the road; require removal in order to inflate or deflate tires; can cause the inflation valve to leak; and are highly visible and more susceptible to theft. In addition, some sensors require the vehicle to be driven in order to be activated, many are too bulky, and some require special brackets or hardware to attach. Finally, many of the current art place sensors in locations (outwardly from the axis of the wheel) where they are subject to radical centrifugal forces.

Thus, as previously noted, the purpose of this invention is to avoid the disadvantages of prior art by integrating a sensor into a wheel. If the sensor is embedded in the wheel rim or disk, then numerous advantages can be realized. First, integrated sensors are well protected and less susceptible to environmental fluctuations including but not limited to, temperature, humidity, harsh chemicals, theft, and/or impact loads. Second, sensors on or in the wheel are easier to assemble and remove. If the sensor is mounted on the "weather" side of the rim (any portion of the wheel that is exposed to weather—as opposed to the tire-side of the rim) then the tire does not have to be removed to gain access to the sensor. Third, the sensor can be located closer to the wheel hub to reduce centrifugal forces and reduce wheel imbalance. Fourth, a sensor can be attached to the wheel or embedded in the wheel more securely and without excessive components/hardware. Fifth, a sensor mounted onto or into the wheel results in less weight, especially when part of the wheel material is removed in order to attach the sensor, to create a mounting void in which the sensor can be mounted, or to create an air passageway/duct to the sensor. Sixth, the placement of the sensor will result in less signal interference. Seventh, sensors in the wheel are less likely to leak air. Eighth, the sensor can be smaller due to the fact that there will often be no need for a bulky and protective sensor housing. Ninth, cost is reduced due to lack of a sensor housing or the reduction in size of such housings, lack of brackets and other mounting hardware, smaller batteries and not having to re-mount tires in order to mount/service sensors.

BRIEF DESCRIPTION OF THE DRAWINGS

FIG. 11 provides a schematic cross-sectional view showing how a bolt-on sensor can be attached to a wheel by means of cap screws.

FIG. 12 provides a schematic cross-sectional view showing how a sensor can be located in the disc portion of a two-piece wheel.

FIG. 13 provides a schematic cross-sectional view showing placement of sensor in the outer portion of a two-piece wheel.

FIG. 14 provides a schematic cross-sectional view showing placement of sensor on the brake side of the disc portion (in contrast to the curb side of the disc portion as illustrated in FIG. 7).

DESCRIPTION

Figure 1:
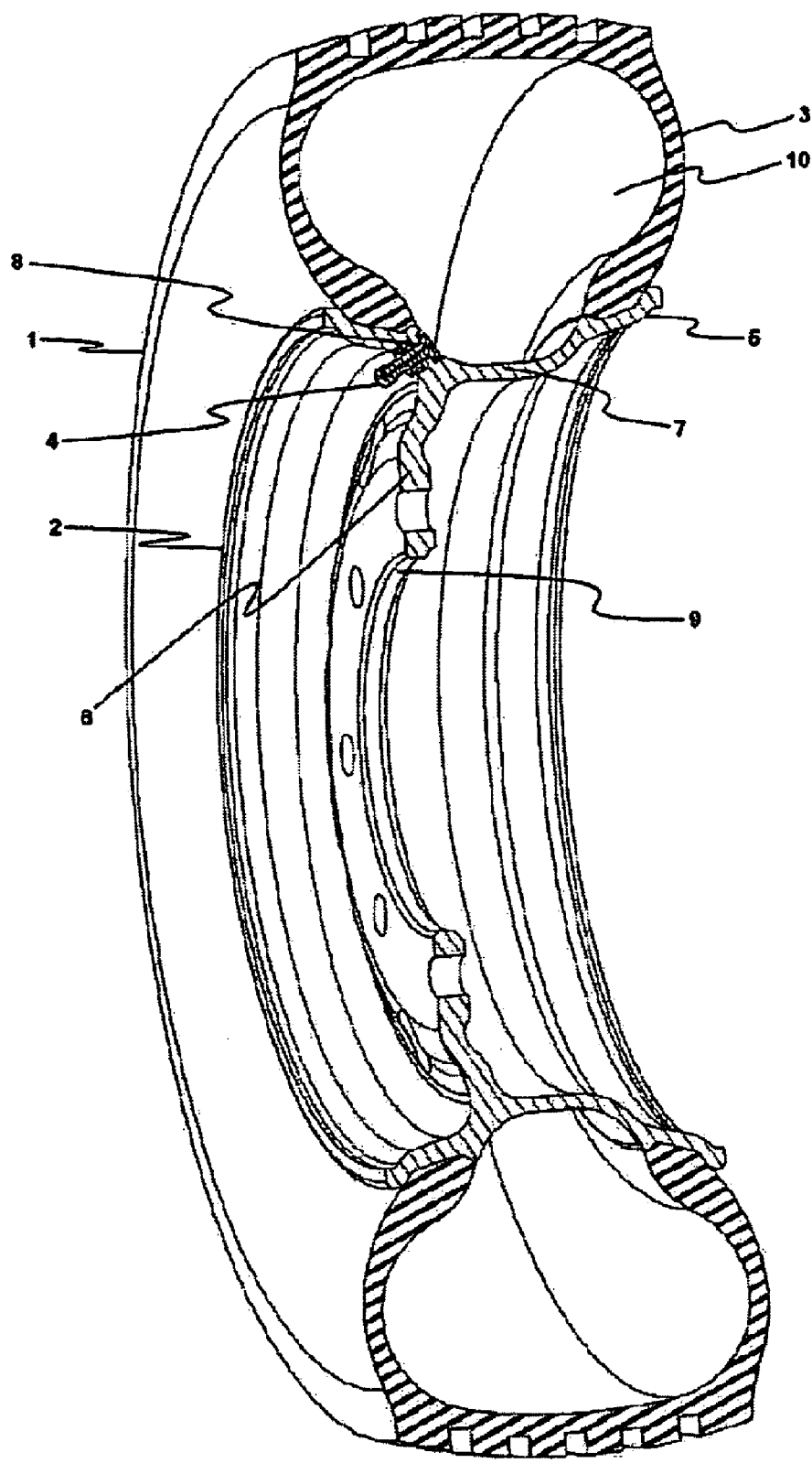
FIG. 1 provides a perspective view of a section of a one-piece wheel assembly without sensor.

Our invention might be described, in general terms, as comprehending all methods and apparatus for mounting a sensor directly onto or into a wheel and/or using internal air passageways in the wheel to communicate air pressure from the tire chamber to a sensor. (As used herein, the term "sensor" is inclusive of any housing or "body" for the sensor; however, such housings will generally be unnecessary and/or de minimis unless the sensor is mounted in an exposed external position). This inventive concept can be actualized in various way, as illustrated in the drawing figures.

Figure 6:
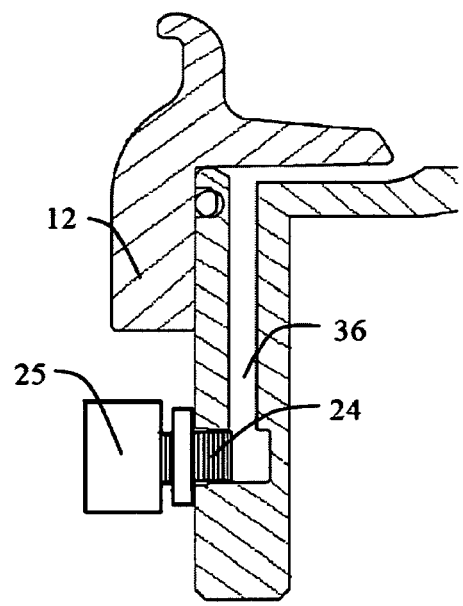
FIG. 6 provides a schematic cross-sectional view showing how a screw-on sensor can be attached to a tank valve mounted to a two-piece wheel.

Thus, FIGS. 6 through 9 provide some initial examples of how screw on sensors can be used in accordance with the teachings of our invention. FIG. 6 shows a tank valve 24 (a tank valve is a special kind of tire inflation valve) mounted to two-piece wheel 12. In this situation, a screw-on sensor 25 with internal threads can be attached to the tank valve 24.

Figure 2:
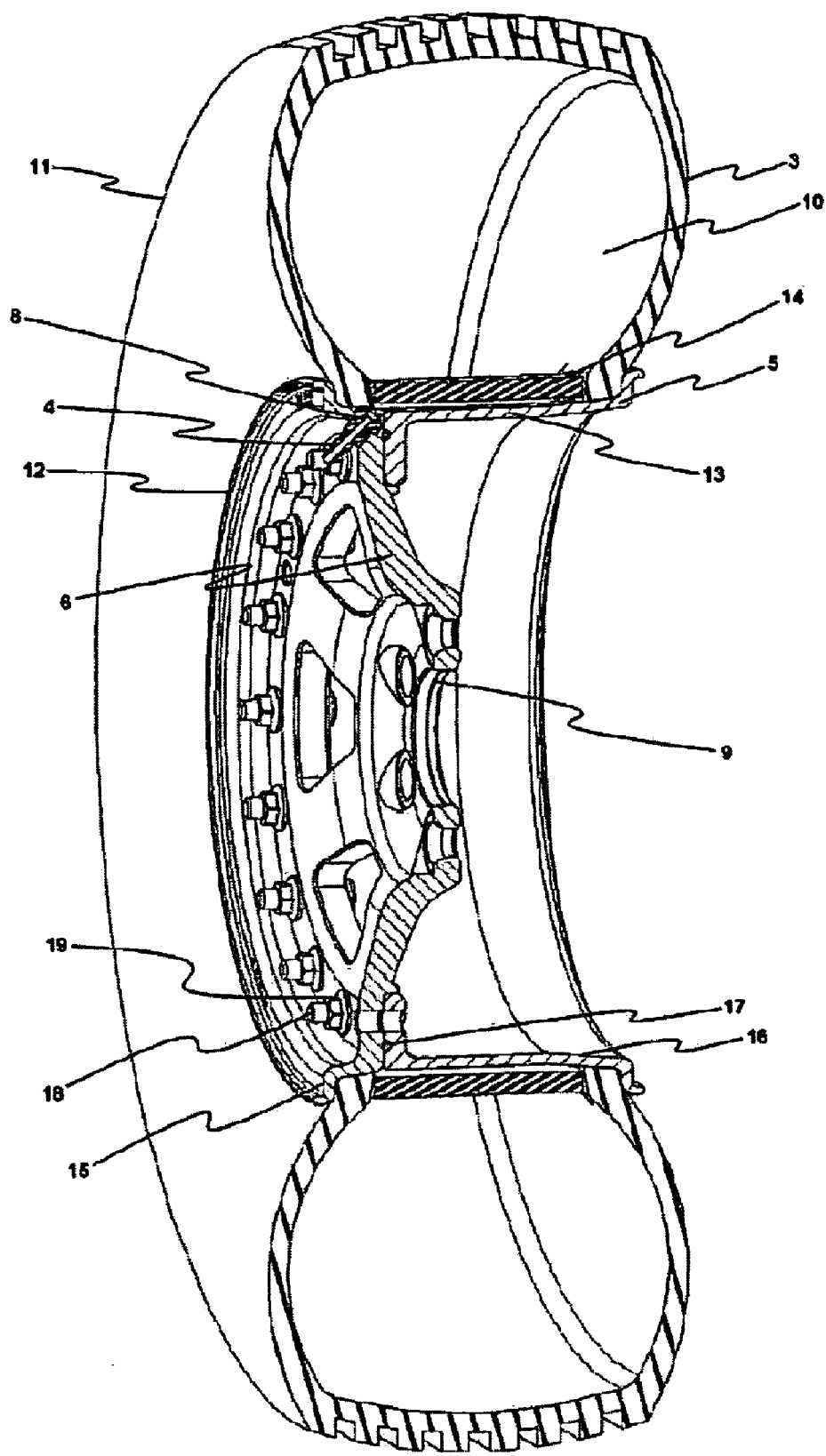
FIG. 2 provides a perspective view of a section of a two-piece wheel assembly without sensor.
Figure 3:
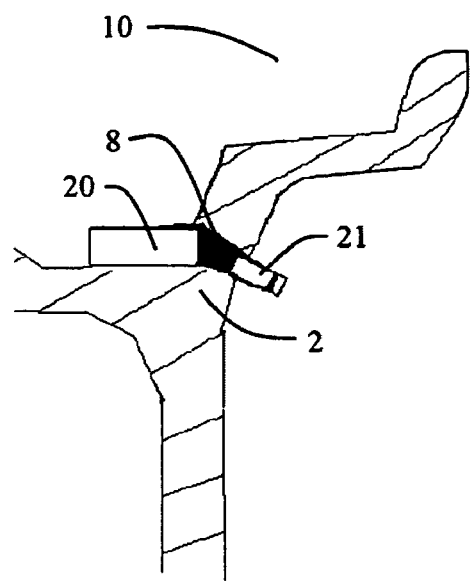
FIG. 3 provides a schematic cross-sectional view showing how a sensor portion may be connected to a valve portion.
Figure 4:
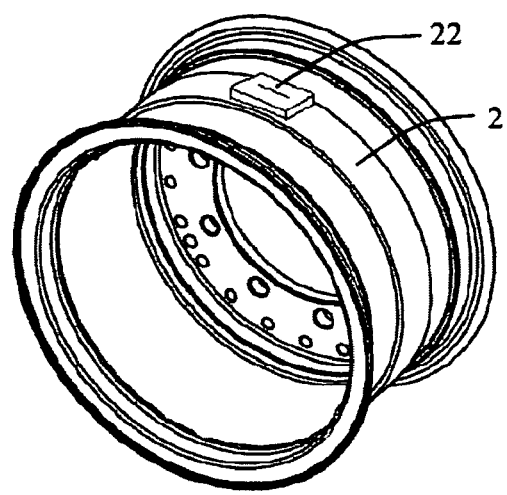
FIG. 4 provides a perspective view of a wheel, illustrating how a sensor can be employed anywhere within a tire cavity.
Figure 5:
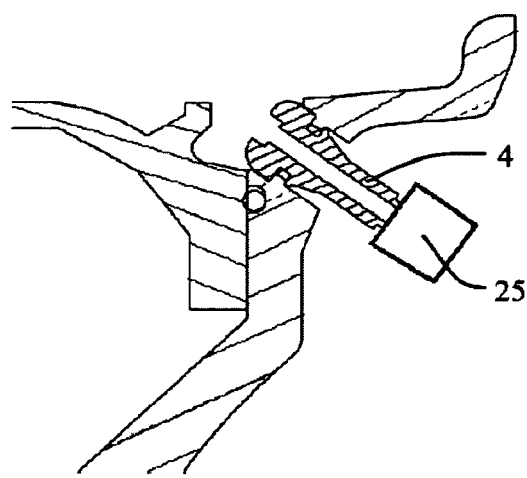
FIG. 5 provides a schematic cross-sectional view showing how a screw-on sensor can be directly attached to an inflation valve.
Figure 7:
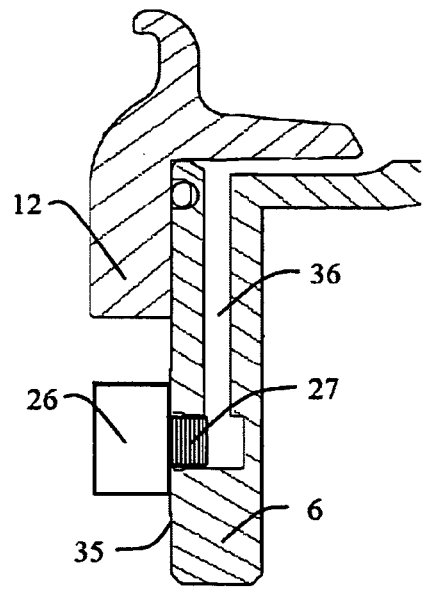
FIG. 7 provides a schematic cross-sectional view showing how a screw-on sensor can be attached directly to a two-piece wheel such that it does not interfere with a standard inflation valve.
Figure 8:
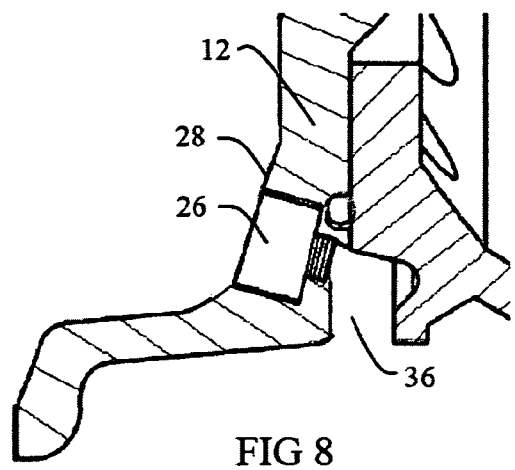
FIG. 8 provides a schematic cross-sectional view showing how a screw-on sensor 26 can be screwed into a two-piece wheel such that there is no protrusion extended beyond the wheel surface.
Figure 9:
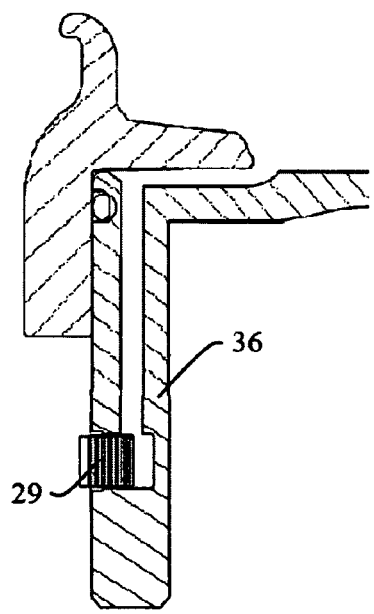
FIG. 9 provides a schematic cross-sectional view showing how a sensor can be screwed into the wheel with threads on the outside diameter of the sensor.

FIG. 7 shows a version where a screw-on sensor 26 attaches directly to the two-piece wheel 12 such that it does not interfere with standard inflation valve 4 (Inflation valve 4 is shown in FIGS. 1 and 2). Sensor 26 is similar to the sensor 25 shown in FIGS. 5 and 6 except sensor 26 has a male screw threaded extension 27 with an air channel therethrough rather than internal female threads. FIG. 8 shows a screw-on sensor 26 screwed into a two-piece wheel 12 such that it does not protrude beyond the wheel surface 28. (A mounting void is provided of size sufficient to accommodate the sensor). FIG. 9 shows a sensor 29 screwed into the wheel via threads on the outside diameter of the sensor.

Figure 10:
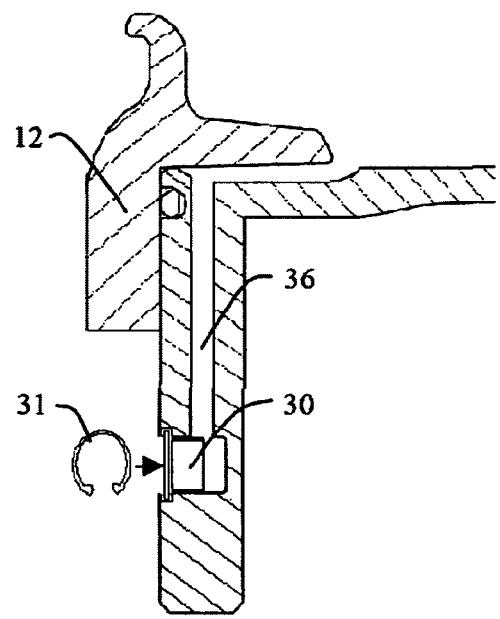
FIG. 10 provides a schematic cross-sectional view showing how a sensor with no threads can be installed in a two-piece wheel by means of a retaining ring.

FIGS. 10 and 11 show some other possibilities. FIG. 10 shows a sensor with no threads 30 installed in a two-piece wheel 12 by means of a retaining ring 31. And, FIG. 11 shows a bolt-on sensor 32 attached to the wheel by means of cap screws 33 passing therethrough. However, all of the foregoing are merely exemplary, numerous other means of attachment can be employed to attach a sensor either onto or into the wheel without deviating from the spirit and scope of the invention.

Figure 15:
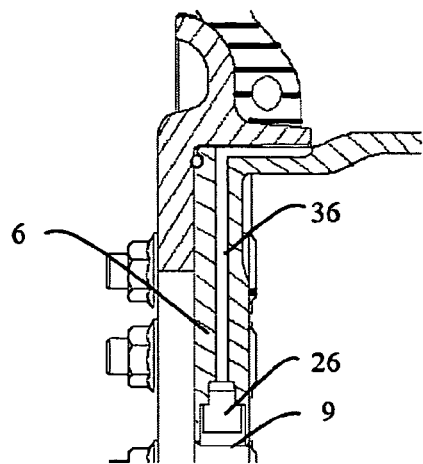
FIG. 15 provides a schematic cross-sectional view showing a sensor placed in the hub bore area of the disc portion.
Figure 16:
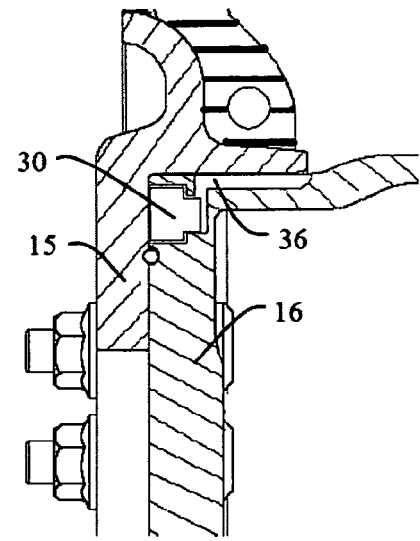
FIGS. 16 and 17 provide schematic cross-sectional views showing placement of a sensor between two rim halves.
Figure 17:
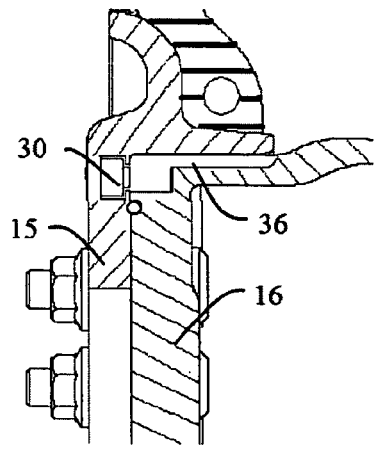
Figure 18:
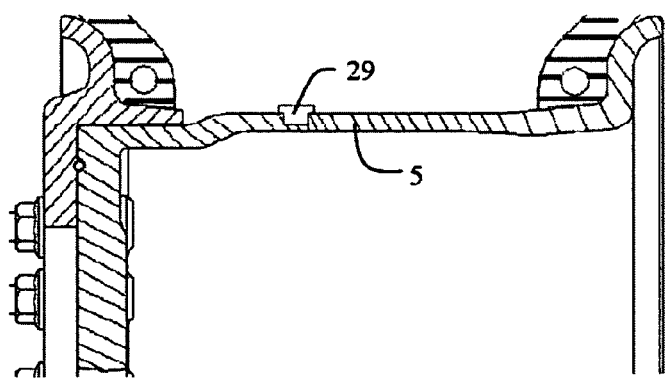
FIGS. 18 and 19 provide schematic cross-sectional views showing a sensor embedded in the rim portion.
Figure 19:
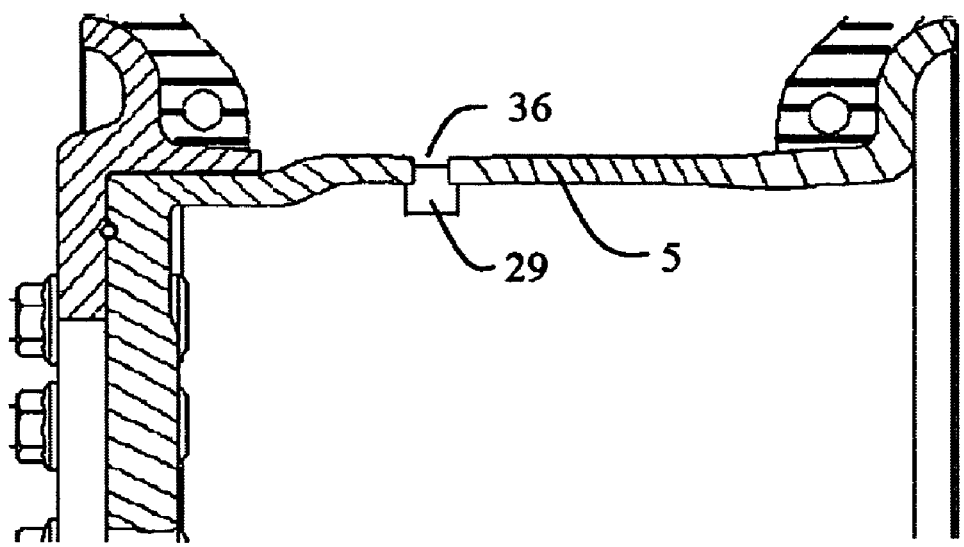
Figure 20:
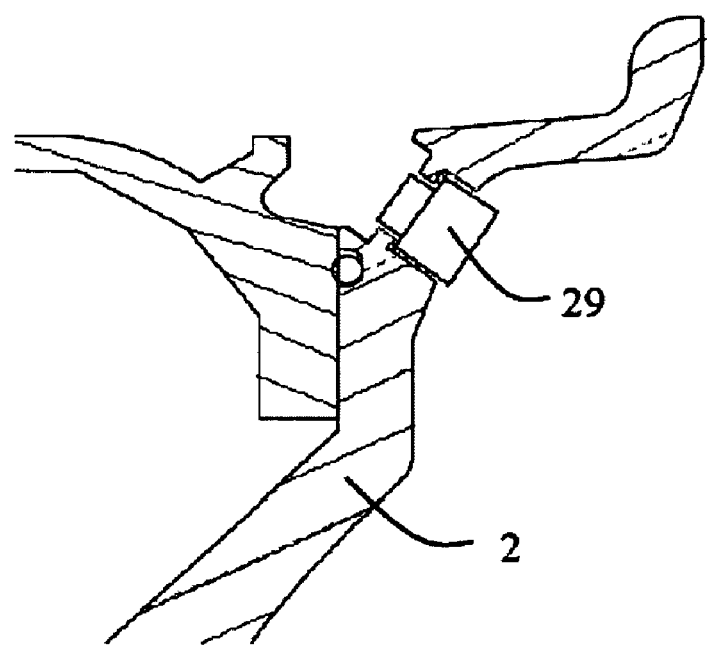
FIG. 20 provides a schematic cross-sectional view showing how a sensor can be placed into or onto a one-piece wheel.

For example, the sensor can be placed in a variety of locations on or inside a wheel assembly. FIG. 12 shows the sensor 26 located in the disc portion 6 of a two-piece wheel 12. FIG. 13 shows placement of sensor 26 in the outer portion 15 of a two-piece wheel 12. FIG. 14 shows placement of sensor 26 on the brake side 34 of the disc portion 6 (compared to the curb side 35 of the disc portion 6 illustrated in FIG. 7). FIG. 15 shows the sensor 26 placed in a void adjacent to and opening onto the hub bore area 9 of the disc portion 6. FIGS. 16 and 17 show placement of the sensor 30 between the portions 15 and 16 so that it is held in place by the two portions. FIGS. 18 and 19 shows a sensor 29 embedded in the rim portion 5. In FIG. 18 the sensor 29 is substantially enclosed within the rim with a flange in (and inlet to) the tire interior. In FIG. 19, the sensor 29 is on the exterior of the rim 5 with an inlet providing communication with the tire interior via a short passageway (or duct) 36. Further, although two-piece wheels 12 are shown in most of these illustrations, it is obvious that a sensor 25, 26, 29, or 30 can be placed onto or into a one-piece wheel 2 as well. (See, FIG. 20 as an example).

Internal air passageways (or ducts) 36 may or may not be used. An example of an internal passageway 36 is shown in many of the figures. The internal passageways 36 are a separate object of this invention and are also comprehended with the scope of this patent.

Figure 21:
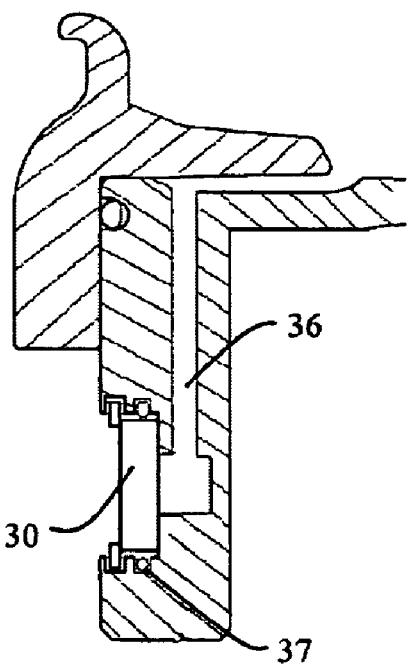
FIG. 21 provides a schematic cross-sectional view showing a sensor sealing off air from an internal passageway by means of a sensor O-ring.

FIG. 21 shows a sensor 30 sealing off air from internal passageway 36 by means of a sensor O-ring 37. Other means of sealing the internal passageway 36 can be used without effecting the invention. A few examples are gaskets; thread sealers, tapered threads or any other means.

Figure 22:
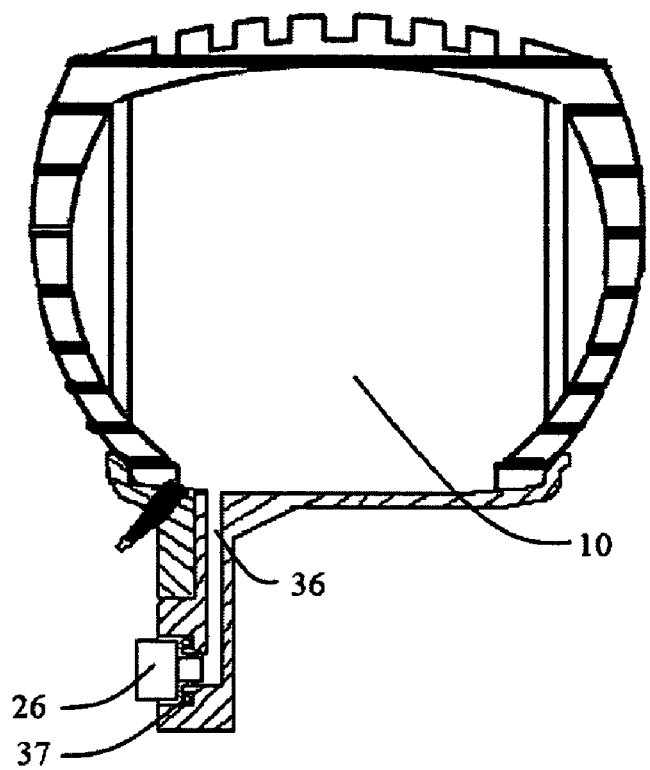
FIG. 22 provides a schematic cross-sectional view showing details of operation of a sensor.

Thus, in accordance with the teachings of our invention and as best seen in FIG. 22, air pressure inside the tire air chamber 10 travels through the internal passageway 36 to the sensor 26. The air can be sealed from escaping around the sensor by means of sensor O-ring 37. The sensor 26 can detect air pressure, temperature, or any other parameter that can be included in the sensor functionality.

From the foregoing, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the claims to be filed hereafter.

PARTS LIST

1. One-piece wheel assembly
2. One-piece wheel
3. Tire
4. Inflation valve
5. Rim portion of wheel
6. Disc portion of wheel
7. Drop center portion of wheel
8. Valve hole
9. Hub bore area
10. Tire air chamber
11. Two-piece wheel assembly
12. Two-piece wheel
13. Rim flat diameter
14. Bead lock
15. Outer portion
16. Inner portion
17. O-ring
18. Stud
19. Nut
20. Sensor portion
21. Valve portion
22. Sensor
23. Bracket or band
24. Tank valve
25. Screw-on sensor (female threads)
26. Screw-on sensor (male threads)
27. Male threads on the sensor
28. Wheel surface
29. Sensor with external threads
30. Sensor with no threads
31. Retaining ring
32. Bolt-on sensor
33. Cap screws
34. Brake side
35. Curb side
36. Internal passageway
37. Sensor O-ring

What is claimed is:

1. An apparatus and system for integration of a sensor into a wheel, comprising:
 a circular wheel rim having formed coaxially on opposite ends thereof outwardly flaring circumferential flange sections disposed to be engaged by the beads of a tubeless tire mounted on the rim;
 said wheel rim having intermediate said opposite ends thereof a transverse wall section extending transversely of the axis of said rim, and having therethrough a central opening disposed coaxially of said axis;
 an air duct formed within at least one of said wall section and said rim to open at one end thereof on the outer periphery of said rim for communication with the interior of the tire mounted thereon; and
 a sensor in communication with the interior of said tire via said air duct, wherein no portion of said sensor is located in the interior of said tire.

2. The apparatus and system for integration of a sensor into a wheel described in claim 1, further comprising a tank valve intermediate said air duct and said sensor.

3. The apparatus and system for integration of a sensor into a wheel described in claim 2, wherein said sensor screws onto said tank valve.

4. The apparatus and system for integration of a sensor into a wheel described in claim 1, wherein said sensor is mounted directly to at least one of said rim and said wall section.

5. The apparatus and system for integration of a sensor into a wheel described in claim 4, wherein said sensor is mounted via at least one of a screw threaded portion interfacing with a mating screw threaded portion in said rim or wall section, a screw threaded portion on an exterior peripheral portion of said sensor, a screw threaded extension of said sensor, a screw threaded portion located internally in said sensor, a retaining ring, a bayonet mount, epoxy, a hold-down cover, and screws passing through said sensor.

6. The apparatus and system for integration of a sensor into a wheel described in claim 1, wherein said sensor is substantially totally contained within at least one of said rim and wall section.

7. The apparatus and system for integration of a sensor into a wheel described in claim 6, wherein said sensor is mounted via at least one of a screw threaded portion on an exterior peripheral portion of said sensor, a screw threaded extension of said sensor, and a retaining ring.

8. The apparatus and system for integration of a sensor into a wheel described in claim 1, wherein said sensor detects at least one of temperature and pressure.

9. The apparatus and system for integration of a sensor into a wheel described in claim 1, wherein said air duct is sealed to said sensor via at least one of an O-ring, gaskets, thread sealers, and tapered threads.

10. An apparatus and system for integration of a sensor into a wheel, comprising:
 a circular wheel rim having formed coaxially on opposite ends thereof outwardly flaring circumferential flange sections disposed to be engaged by the beads of a tubeless tire mounted on the rim;
 said wheel rim having intermediate said opposite ends thereof a transverse wall section extending transversely of the axis of said rim, said wall section having therethrough a central opening disposed coaxially of said axis, said wall section being formed from an outer portion and an inner portion releasably secured together with a resilient O-ring sealingly secured between confronting surfaces of said rim portions so as to create a sealed space, which space includes the interior of the tire mounted thereon; and
 a sensor located within said sealed space so as to be in communication with the interior of said tire, but wherein no portion of said sensor is located in the interior of said tire.

11. The apparatus and system for integration of a sensor into a wheel described in claim 10, further comprising an air duct formed within at least one of said wall section and said rim to open at one end thereof on the outer periphery of said rim for communication with the interior of the tire mounted thereon, wherein said sensor is in communication with the interior of said tire via said air duct.

12. The apparatus and system for integration of a sensor into a wheel described in claim 11, wherein said sensor detects at least one of temperature and pressure.

13. The apparatus and system for integration of a sensor into a wheel described in claim 10, wherein said sensor body is substantially totally contained within at least one of said rim and wall section.

14. The apparatus and system for integration of a sensor into a wheel described in claim 13, wherein said sensor body is held in position by and between the inner portion and the outer portion of said wall section.

15. An apparatus and system for integration of a sensor into a wheel, comprising:
- a circular wheel rim having formed coaxially on opposite ends thereof outwardly flaring circumferential flange sections disposed to be engaged by the beads of a tubeless tire mounted on the rim;
- said wheel rim having intermediate said opposite ends thereof a transverse wall section extending transversely of the axis of said rim, and having therethrough a central opening disposed coaxially of said axis; and
- a sensor mounted directly to at least one of said rim and said wall section, said sensor being in communication with the interior of said tire.

16. The apparatus and system for integration of a sensor into a wheel described in claim 15, wherein said sensor is substantially totally contained within at least one of said rim and wall section.

17. The apparatus and system for integration of a sensor into a wheel described in claim 16, wherein said sensor detects at least one of temperature and pressure.

18. The apparatus and system for integration of a sensor into a wheel described in claim 15, wherein said sensor is mounted via at least one of a screw threaded portion interfacing with a mating screw threaded portion in said rim or wall section, a screw threaded portion on an exterior peripheral portion of said sensor, a screw threaded extension of said sensor, a screw threaded portion located internally in said sensor, a retaining ring, a bayonet mount, epoxy, a hold-down cover, and screws passing through said sensor.

19. The apparatus and system for integration of a sensor into a wheel described in claim 15, further comprising an air duct formed within at least one of said wall section and said rim to open at one end thereof on the outer periphery of said rim for communication with the interior of the tire mounted thereon, wherein said sensor is in communication with the interior of said tire via said air duct.

20. The apparatus and system for integration of a sensor into a wheel described in claim 19, wherein said air duct is sealed to said sensor via at least one of an O-ring, gaskets, thread sealers, and tapered threads.

* * * * *